United States Patent
Zhang et al.

(10) Patent No.: US 9,401,600 B2
(45) Date of Patent: Jul. 26, 2016

(54) OVERVOLTAGE PROTECTION CIRCUIT, OVERVOLTAGE PROTECTION METHOD AND PANEL DRIVING CIRCUIT

(71) Applicant: SHENZHEN CHINA STAR OPTOELECTRONICS TECHNOLOGY CO., LTD., Shenzhen, Guangdong (CN)

(72) Inventors: Hua Zhang, Guangdong (CN); Xiang Yang, Guangdong (CN)

(*) Notice: Subject to any disclaimer, the term of this patent is extended or adjusted under 35 U.S.C. 154(b) by 0 days.

(21) Appl. No.: 14/008,075

(22) PCT Filed: Jun. 29, 2013

(86) PCT No.: PCT/CN2013/078484
§ 371 (c)(1),
(2) Date: Sep. 27, 2013

(87) PCT Pub. No.: WO2014/183329
PCT Pub. Date: Nov. 20, 2014

(65) Prior Publication Data
US 2016/0064925 A1 Mar. 3, 2016

(30) Foreign Application Priority Data
May 17, 2013 (CN) .......................... 2013 1 0185896

(51) Int. Cl.
*H05B 33/08* (2006.01)
*H02H 9/04* (2006.01)
*G09G 3/34* (2006.01)

(52) U.S. Cl.
CPC ............... *H02H 9/04* (2013.01); *G09G 3/3426* (2013.01); *H02H 9/041* (2013.01); *H05B 33/0884* (2013.01); *G09G 2330/04* (2013.01)

(58) Field of Classification Search
CPC ........... H05B 33/0815; H05B 33/0818; H05B 33/0884; H05B 33/0809; H05B 37/029; H05B 37/02
USPC .................................. 315/192, 225, 307, 294
See application file for complete search history.

(56) References Cited

U.S. PATENT DOCUMENTS

2002/0033702 A1* 3/2002 St-German ........... B61L 5/1881
324/550
2009/0021871 A1* 1/2009 Moran ..................... B60K 6/28
361/15

(Continued)

FOREIGN PATENT DOCUMENTS

CN            2925000     *   7/2007
CN            2925000 Y       7/2007

(Continued)

OTHER PUBLICATIONS

Translation of FOR KR20130044102.*

(Continued)

*Primary Examiner* — Douglas W Owens
*Assistant Examiner* — Syed M Kaiser (57) ABSTRACT

The present invention provides an overvoltage protection circuit, an overvoltage protection method and a panel driving circuit, wherein, the overvoltage protection circuit adjusts drive output voltage of LED strings coupled with a main IC and a secondary IC and includes a main IC overvoltage triggering circuit and a secondary IC overvoltage triggering circuit, wherein, the main IC overvoltage triggering circuit connected respectively in series with said main IC and several LED strings, said secondary IC overvoltage triggering circuit connected respectively in series with the secondary IC and several LED strings, overvoltage protection triggering points are set respectively in the main IC and the secondary IC, and the voltage value of the overvoltage protection's triggering point of the secondary IC is less than that of the main IC.

8 Claims, 2 Drawing Sheets

(56) References Cited

U.S. PATENT DOCUMENTS

| | | | | |
|---|---|---|---|---|
| 2009/0026977 A1* | 1/2009 | Omi | ............... | H02M 1/36 315/294 |
| 2011/0043134 A1* | 2/2011 | Lee | ............... | H05B 33/0818 315/294 |
| 2012/0299500 A1* | 11/2012 | Sadwick | ............... | H05B 33/0887 315/224 |
| 2013/0154546 A1* | 6/2013 | Kleczewski | ............... | H02H 3/202 320/107 |
| 2013/0169165 A1* | 7/2013 | Sadwick | ............... | H05B 33/0815 315/152 |
| 2013/0193879 A1* | 8/2013 | Sadwick | ............... | H05B 33/0818 315/307 |

FOREIGN PATENT DOCUMENTS

| | | |
|---|---|---|
| CN | 102750920 A | 10/2012 |
| CN | 103037589 A | 4/2013 |
| KR | 10-2013-0044102 A | 5/2013 |
| KR | 20130044102 * | 5/2013 |

OTHER PUBLICATIONS

Translation of FOR CN2925000.*

Guo ChunChun, the International Searching Authority written comments, Jan. 2014, CN.

* cited by examiner

OVERVOLTAGE PROTECTION CIRCUIT, OVERVOLTAGE PROTECTION METHOD AND PANEL DRIVING CIRCUIT

TECHNICAL FIELD OF THE INVENTION

The present invention relates an overvoltage protection circuit, an overvoltage protection method and a panel driving circuit, and more particularly to an overvoltage protection circuit and a method thereof, in which an overvoltage triggering circuit of a main IC provides the overvoltage protection to LED strings, and a panel driving circuit adopting the overvoltage protection circuit.

BACKGROUND OF THE INVENTION

Figure 1:
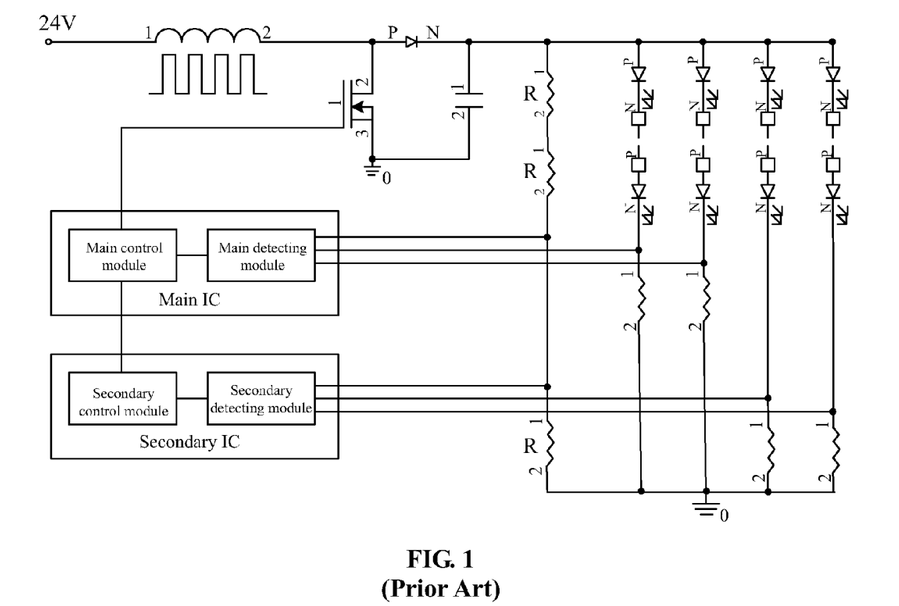
FIG. 1 is an overvoltage protection circuit diagram according to a prior art.

The channels (LED strings to be driven) of a constant current drive IC of a single LED is limited, and as large-size LCD TVs need more LED strings to provide their backlighting high brightness, it is need to couple a plurality of ICs, wherein an IC provides drive signals to a MOS tube to make the whole circuit work normally. The IC is a main IC, and other ICs only need to provide dimming pins to connect the LED strings, so they are secondary ICs. A known main-secondary connecting mode circuit is shown in FIG. 1, divider resistances of each IC need to be set with output overvoltage protecting points respectively. If the output overvoltage protecting points of each IC are set in a same way, the triggering voltage values of the overvoltage protection of each IC may be different in actual operations, and the state in which the IC cannot trigger the overvoltage protection may be appeared because of the resistances' accuracy or IC's individual difference.

When multiple ICs are coupled in the main-secondary mode, the output voltage is determined by the drive signal of the main IC. If the voltage value of the overvoltage protection of the main IC is less than that of the secondary IC, and when the LED strings coupled to the secondary IC appear open circuits thereof, then the output voltage controlled by the main IC rises, at this time, the overvoltage protection of the main IC is triggered and the situation that each LED string coupled to the main IC starts to be detected. However, the secondary ICs cannot trigger their own overvoltage protection because their triggering voltage values are relatively larger, which results that the LED strings appearing open circuits cannot be closed, and the output voltage controlled by the main IC remains in a high voltage state, so the whole circuit is unstable.

Therefore, it is necessary to provide an overvoltage protection circuit of LED strings controlled separately by a main IC and secondary ICs.

SUMMARY OF THE INVENTION

On account of the lack of the prior art, the object of the present invention is to provide an overvoltage protection circuit of LED strings controlled separately by a main IC and a secondary IC, such that both main IC and secondary IC can play a role when certain abnormal condition occurs to the LED strings.

Another object of the present invention is to provide an overvoltage protection method of said overvoltage protection circuit.

Another object of the present invention is to provide a panel driving circuit adopting the overvoltage protection circuit.

The present invention provides an overvoltage protection circuit, arranged to adjust the drive output voltage of the LED strings coupled with the main IC and the secondary IC, and comprises a main IC overvoltage triggering circuit and a secondary IC overvoltage triggering circuit, wherein: the main IC overvoltage triggering circuit connected respectively in series with the main IC and several LED strings. The secondary IC overvoltage triggering circuit connected respectively in series with the secondary IC and several LED strings. Overvoltage protection triggering points are set respectively in the main IC and the secondary IC, and the voltage value of the overvoltage protection triggering point of the secondary IC is less than that of the main IC.

Perfectly, the minimum voltage of the secondary IC is larger than the maximum voltage of the main IC, and the minimum voltage of the secondary IC is 0.7-1V larger that the maximum voltage of the main IC. The main IC overvoltage triggering circuit has at least two divider resistances that connected in series each other; also, the secondary IC overvoltage triggering circuit has at least two divider resistances that connected in series each other. Wherein, overvoltage protection triggering point of the main IC is set in the main divider resistances, and overvoltage protection triggering point of the secondary IC is set in the second divider resistances.

Perfectly, the main divider resistance has a first resistance and a second resistance. The first resistance is set between the overvoltage protection triggering point of the main IC and the drive output end, the second resistance is set between the overvoltage protection triggering point of the main IC and the ground end. The second divider resistance has a third resistance and a forth resistance. The third resistance is set between the overvoltage protection triggering point of the secondary IC and the drive output end, the forth resistance is set between the overvoltage protection triggering point of the secondary IC and the ground end. Wherein, the ratio of the forth resistance value and the sum of the third resistance value and the forth resistance value of the second divider resistance is larger than the ratio of the second resistance value and the sum of the first resistance value and the second resistance value of the main divider resistance.

Perfectly, the main divider resistance has a first resistance, a second resistance and a third resistance. The first resistance and the second resistance are set between the overvoltage protection triggering point of the main IC and the drive output end, the third resistance is set between the overvoltage protection triggering point of the main IC and the ground end. A forth and a fifth resistances are set between the overvoltage protection triggering point of the secondary IC and the drive output end, a sixth resistance is set between the overvoltage protection triggering point of the secondary IC and the ground end. Wherein, the ratio of the sixth resistance value and the sum of the forth, the fifth and the sixth resistance values of the second divider resistance is larger than the ratio of the third resistance value and the sum of the first, the second and the third resistance values of the main divider resistance. Wherein, the third resistance value of the main divider resistances may be equal to that of the sixth resistance.

Perfectly, the main IC has a main control module and a main detecting module coupled thereof. The main detecting module is coupled to the main divider resistances to detect the voltage's change of the main divider resistances. The main control module is coupled to the driving output end of the LED strings to adjust the voltage of the driving output end according the detecting result of the main detecting module. The secondary IC has a secondary control module and a secondary detecting module coupled thereof. The secondary detecting module is coupled to the secondary divider resistances to detect the voltage's change of the secondary divider resistances. The secondary control module is coupled to the driving output end to adjust the voltage of the driving output end according the detecting result of the secondary detecting module. In the secondary IC, with the output voltage rises, the secondary control module sends a closing detection instruction to the LED strings appearing open circuits to interrupt the voltage/current detection when the secondary detecting module detects that the voltage of the second divider resistances arrives at that of the overvoltage protection point of the secondary IC. In the main IC, the main control module sends a closing detection instruction to the LED strings appearing open circuits to interrupt the voltage/current detection and to drive the driving output end of the LED strings to reduce its output voltage when the main detecting module detects that the voltage of the main divider resistances arrives at that of the overvoltage protection point of the main IC.

Perfectly, the main detecting module is coupled respectively to each LED string connected in series with a current limiting resistance. Once the main detecting module detects that the voltage value of a current limiting resistance of certain LED string' circuit is larger that a predefined value, it sends such feedback to the main control module, which then to send a closing detection instruction to the LED string to close the detection of the corresponding LED string and to control the driving output end of the LED string to reduce its output voltage. The secondary detecting module is coupled respectively to each LED string connected in series with a current limiting resistance. Once the secondary detecting module detects that the voltage value of a current limiting resistance of certain LED string's circuit is larger that a predefined value, it sends such feedback to the secondary control module, which then to send a closing detection instruction to the LED string to close the detection of the corresponding LED string. The main IC and the secondary IC control each LED string' opening and closing by a negative feedback.

The present invention provides an overvoltage protection method adopting aforementioned overvoltage protection circuit; the method comprises the steps of:

Step 1: setting overvoltage protection points of the main IC and the secondary IC respectively in their overvoltage triggering circuits, the voltage value of the secondary IC's overvoltage protection triggering point is less that that of the main IC;

Step 2: with the output voltage rises, when the secondary detecting module detects the relationship of the voltage of the second divider resistances and the overvoltage protection triggering point of the secondary IC:

If the voltage of the second divider resistances arrives at that of the overvoltage protection triggering point, the secondary control module sends a closing detection instruction to the LED strings appearing open circuits to interrupt the voltage/current detection;

Step 3: when the main detecting module detects the relationship of the voltage of the main divider resistances and the overvoltage protection triggering point of the main IC:

If the voltage of the main divider resistances arrives at that of the overvoltage protection triggering point, the main control module sends a closing instruction to the LED strings appearing open circuits and to reduce the output voltage;

Step 4: the main control module adjusts the voltage adjusting extend of the LEDs' drive output end according to the feedback of the main detecting module;

Step 41: according to the feedback of the main detecting module, when to need increase the output voltage, the main control module sends a voltage rising control signal to a MOS tube to drive the MOS tube to increase its duty cycle, thus to drive the voltage increasing extend of the LEDs' drive output end.

Step 42, when to need reduce the output voltage, the main control module sends a voltage reducing control signal to a MOS tube to drive the MOS tube to reduce its duty cycle, thus to drive the voltage reducing extend of the LEDs' drive output end.

The present invention provides a panel driving circuit including LED strings with the main IC and the secondary ICs, and the aforementioned overvoltage protection circuit arranged to adjust the voltage of the LED strings' drive output end.

Compared to the prior art, the overvoltage protection circuit and the method thereof, and the panel driving circuit of the present invention, wherein the main IC and the secondary IC are set respectively with the overvoltage triggering circuit in the overvoltage protection circuit. By changing the coupled method of the main IC and the secondary IC with the overvoltage triggering circuit, and selecting the ratio of the divider resistances of the main IC and the secondary IC, wherein the overvoltage protection triggering point of the secondary IC is lower than that of the main IC, thus, when certain abnormal condition occurs, with the output voltage rising, the secondary IC triggers the overvoltage protection earlier than that of the main IC to reflect the working statue of the LED strings in real time.

DETAILED DESCRIPTION OF THE PREFERRED EMBODIMENTS

Figure 2:
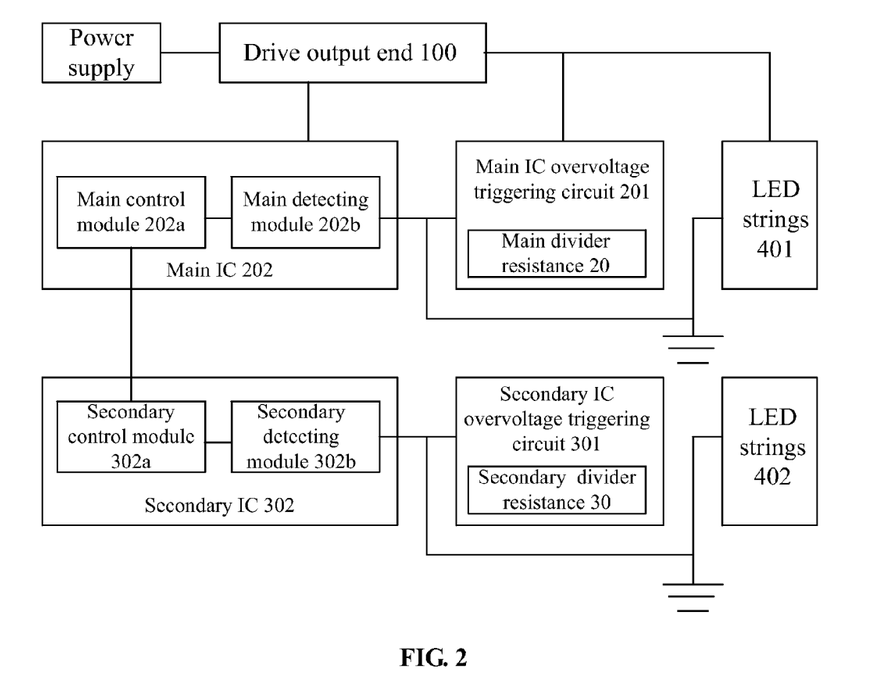
FIG. 2 is an overvoltage protection circuit block diagram according to the present invention.

Please refer to FIG. 2, some problems concerting to overvoltage protection of the output voltage may appear when multiple LED strings are coupled to a main IC and a secondary IC, in fact, they can be solved by adjusting the drive output voltage of a plurality of LED strings in large LCD TV. The present invention provides an overvoltage protection circuit, arranged to adjust the voltage of a drive output end 100 of LED strings 401, 402 having a main IC and a secondary IC therein. The overvoltage protection circuit includes a main IC overvoltage triggering circuit 201 and a secondary IC overvoltage triggering circuit 301, wherein the main IC overvoltage triggering circuit 201 is coupled respectively to the main IC 202 and a plurality of LED strings 401, and the secondary IC overvoltage triggering circuit 301 is coupled respectively to the secondary IC 302 and a plurality of LED strings 402. Overvoltage protection points are set respectively in the main IC 202 and the secondary IC 302, and the voltage of the overvoltage protection triggering point of the secondary IC 302 is less than that of the main IC 202. According to a voltage changing value from the main IC overvoltage triggering circuit 201, the main IC 202 controls the On-off of the LED strings 401 coupled thereof and adjusts the output voltage. The secondary IC overvoltage triggering circuit 301 is coupled respectively to the secondary IC 302 and a plurality of LED strings 402, and according to a voltage changing value from the secondary IC overvoltage triggering circuit 301, the secondary IC 302 controls the On-off of the LED strings 402 coupled thereof to make sure the drive output end 100 of the LEDs can be supplied normally, thus to avoid the output voltage keeping a high level in a long time, because it may make the whole circuit unstable.

The main IC 202 includes a main control module 202a and a main detecting module 202b coupled therein, the main detecting module 202b is coupled to a main divider resistance 20 to detect the variation of the voltage thereof, and the main control module 202a is coupled to the LED drive output end 100 to adjust its voltage according to the detecting result of the main detecting module 202b. The secondary IC 302 includes a secondary control module 302a and a secondary detecting module 302b coupled therein, the secondary detecting module 302b is coupled to a second divider resistance 30 to detect the variation of the voltage thereof, and the secondary control module 302a is coupled to the LED drive output end 100 to adjust its voltage according to the detecting result of the secondary detecting module 302b.

The minimum voltage of the secondary IC overvoltage triggering circuit may be larger than the maximum voltage of the main IC, thus to make the voltage values of the overvoltage protection triggering points of the secondary ICs 302 are less than that of the main IC 202, and therefore, the voltage of the divider resistance of the secondary IC overvoltage triggering circuit can arrive the overvoltage protection triggering point. Perfectly, the minimum voltage of the secondary IC is 0.7-1V larger than the maximum voltage of the main IC.

Please refer to FIGS. 2 and 3, the main IC overvoltage triggering circuit 201 and the secondary IC overvoltage triggering circuit 301 are described in detail hereinafter. The main IC overvoltage triggering circuit 201 includes at least two main divider resistances 20 that connected in series each other; also, the secondary IC overvoltage triggering circuit 301 has at least two said second divider resistances 30 that connected in series each other. Wherein, overvoltage protection triggering points of the main IC is set between the main divider resistances 20, and overvoltage protection triggering points of the secondary IC is set between the second divider resistances 30. The voltage of each resistance is adjusted by distribution of resistance value in order to make the overvoltage triggering points of the main and secondary IC different.

In the present embodiment, the main divider resistance includes a first resistance (R1') and a second resistance (R2'). The first resistance (R1') is set between the overvoltage protection triggering point and the drive output end of the main IC, the second resistance (R2') is set between the overvoltage protection triggering point and a ground end of the main IC, the detecting point of the main detecting module 202b is set between the first resistance (R1') and the second resistance (R2'). The second divider resistance includes a third resistance (R3') and a forth resistance (R4'). The third resistance (R3') is set between the overvoltage protection triggering point and the drive output end of the secondary IC, the forth resistance (R4') is set between the overvoltage protection triggering point and the ground end of the secondary IC. The detecting point of the main detecting module 302b is set between the third resistance (R3') and the forth resistance (R4'). Wherein, the ratio of the value of the forth resistance (R4') and the sum of the values of the third resistance (R3') and the forth resistance (R4') of the secondary divider resistance is larger than the ratio of the value of the second resistance (R2') and the sum of the values of the first resistance (R1') and the second resistance (R2') of the main divider resistance, that means to satisfy the conditions following:

$$\frac{R2'}{R1'+R2'} > \frac{R4'}{R3'+R4'}.$$

According to the divider principle, the voltage of the overvoltage protection triggering of the secondary IC 302 is less than that of the main IC 202, and as the voltage of the forth resistance (R4') is higher than that of the second resistance (R2'), so the voltage of the forth resistance (R4') arrives the overvoltage protection triggering point of the secondary IC early, and the overvoltage protection circuit of the secondary IC is triggered firstly.

Figure 3:
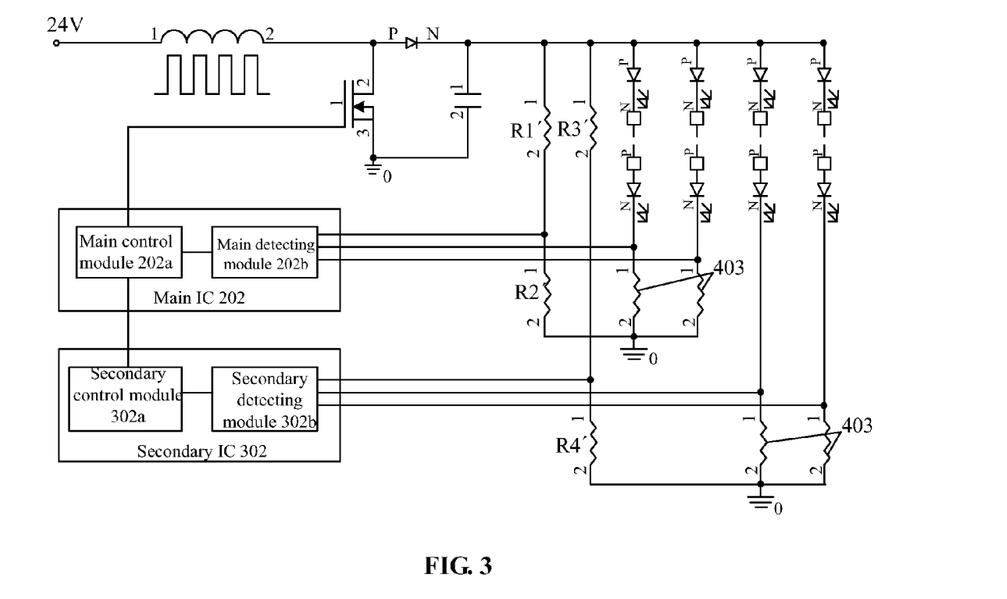
FIG. 3 is an overvoltage protection circuit diagram according to a first embodiment the present invention.

Please refer to FIG. 3, in an embodiment, the voltage value of the LED drive output end is 24V obtained by jointly controlling of an inductance and a MOS tube. The load voltage of each LED string is adjusted according to the drive signal's duty cycle of the MOS tube, and the drive signal output from the MOS tube is adjusted by the main IC. The output voltage V0=Vin (1−D), wherein, D represents the duty cycle of the MOS tube. In the main-secondary mode of multiple ICs, only the main IC controls the drive signal, otherwise the circuit may be disordered and works abnormally.

The overvoltage protection triggering range set for the main IC is 2.4V-2.6V, the highest output voltage of the LED drive output end is controlled at 90V (the output voltage cannot be too high considering the withstand voltage of the circuit's components). The main divider resistances R1' and R2' are selected with a triggering voltage 2.4V by the main overvoltage triggering circuit 201, as R2'/R1'=2.4/(90−2.4), the resistances' values may be selected arbitrarily, as long as they satisfy the ratio relationship. The voltage values of the main divider resistances R1' and R2' are appointed by the ratio of the resistances' values. For the secondary IC, the output overvoltage protection is activated before the output voltage value arrives at 90V, and the secondary IC overvoltage triggering circuit may be selected at 85V to calculate the ratio of the R3' and R4'. The triggering voltage may be selected at 2.6V for the secondary IC to make sure that the secondary IC trigger the protection mode firstly, as R4'/R3'=2.6/(85−2.6), the resistance values may be selected arbitrarily, as long as they satisfy the ratio relationship.

Once certain LED string coupled to the secondary detecting module appears an abnormal statue (the open circuit or certain LED is broken), the secondary detecting module 302b outputs a control signal to the main IC control module 202a if it detects this statue. The duty cycle of the drive signal output to the MOS tube is controlled by the main control module 202a of the main IC, the duty cycle is increased and the output voltage is raised. After dividing the output voltage by the divider resistances R1'-R4', and when the voltage of the LED drive output end rise to the overvoltage protection point of the main IC 202, the main IC 202 triggers its own overvoltage protection, the control process is described above, the voltage of the secondary divider resistance arrives the overvoltage triggering point of the secondary IC 302 firstly, thus to trigger the overvoltage protection of the secondary IC 302, and to exclude the LED strings that have abnormal situations. Because the negative ends of the LED strings are coupled to the secondary IC pin, the detecting control circuit coupled with the secondary IC 302 and the negative ends of the LED strings is cut off. The voltage/current detecting of the LED string having the open circuit by the secondary detecting module 302b is closed by the secondary control module 302a, that means the abnormal statues of the voltage/current of the LED string are no longer detected, at this time, the others LED strings keep working normally, the duty cycle D of the MOS tube's drive signal output by the main IC is reduced, and then to reduce the output voltage, for this reason, the LED strings can work normally.

The voltages are calculated as the following. The range of the normal output voltage of the main IC is Va-Vb, the stable output voltage of the whole circuit is Vout, and the maximum value of the output overvoltage is 1.2*Vout. When to select the resistance values of the R1'-R4', firstly, the values of the R1' and R2' are selected. According to Va and the maximum value of the output overvoltage 1.2*Vout, the main IC calculates that the R2'/(R1'+R2') is equal to Va/(1.2*Vout), the values of the R1' and R2' can be chosen arbitrarily on the kΩ level. To ensure the maximum value of the output overvoltage as the IC triggers is less than that of the main IC, according to Vb and the voltage which is less than the maximum value of the output overvoltage 1.2*Vout, the secondary IC calculates that the R4'/(R3'+R4') is bigger than Vb/(1.2*Vout), the values of the R3' and R4' can be chosen arbitrarily on the kΩ level. Overall, R4'/(R3'+R4') is bigger than R2'/(R1'+R2'), so, at any time of outputting the voltage, the value of the R4' must be bigger than that of the R2', that means the secondary IC can trigger the output overvoltage protection earlier than the main IC.

In the present invention, the main divider resistance meets the following conditions: the third resistance (R3)/[the first resistance (R1)+the second resistance (R2)]=the overvoltage protection point of the main IC/[the maximum output voltage when the main IC works on the overvoltage protection–the overvoltage protection point' voltage of the main IC]. The secondary divider resistance meets the following conditions: the sixth resistance (R6)/[the forth resistance (R4)+the fifth resistance (R5)]=the overvoltage protection point of the secondary IC/[the maximum output voltage when the secondary IC works on the overvoltage protection–the overvoltage protection point's voltage of the secondary IC].

Figure 4:
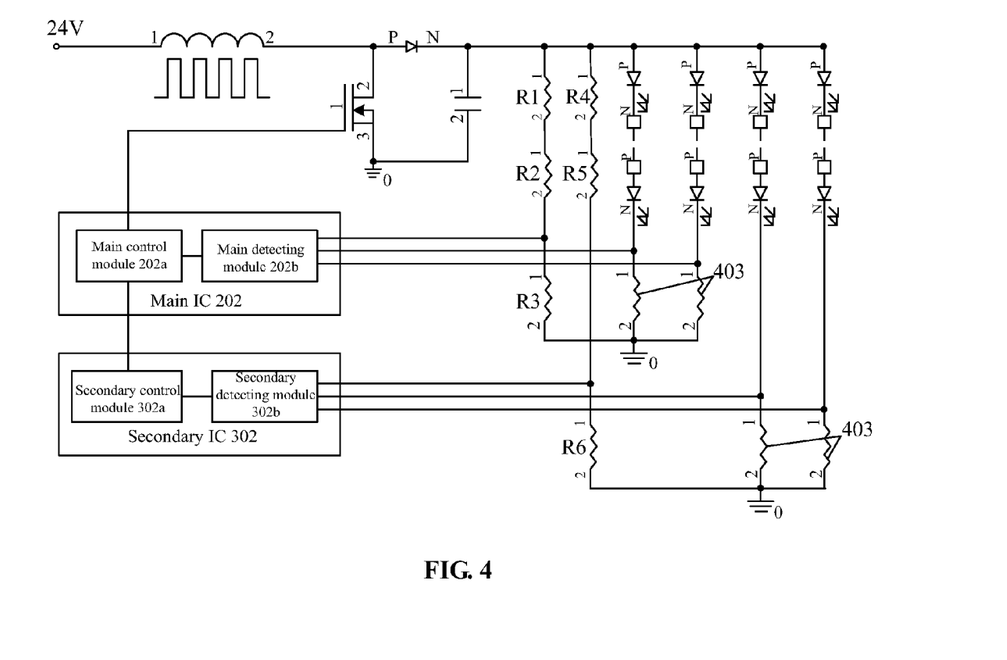
FIG. 4 is an overvoltage protection circuit diagram according to a second embodiment the present invention.

Please refer to FIG. 4, which shows a second embodiment. The main IC overvoltage triggering circuit 201 includes three main divider resistances 20 connected in series. The main divider resistance includes a first resistance (R1'), a second resistance (R2') and a third resistance (R3'). The first resistance (R1') and the second resistance (R2') are set between the overvoltage protection triggering points of the main IC and the drive output end, the third resistance (R3') is set between the overvoltage protection triggering points of the main IC and a ground end. The forth resistance (R4') and the fifth resistance (R5') are set between the overvoltage protection triggering points of the main IC and the drive output end, the sixth resistance (R6') is set between the overvoltage protection triggering points of the main IC and a ground end. Wherein, the ratio of the value of the sixth resistance (R6') and the sum of the values of the forth resistance (R4'), the fifth resistance (R5') and the sixth resistance (R6') of the secondary divider resistance is larger than the ratio of the value of the third resistance (R3') and the sum of the values of the first resistance (R1'), the second resistance (R2') and the third resistance (R3') of the main divider resistance, that means to satisfy the conditions following:

$$\frac{R3}{R1+R2+R3} > \frac{R6}{R4+R5+R6}.$$

According to the divider principle, the voltage of the overvoltage protection triggering of the secondary IC 302 is less than that of the main IC 202, and as the voltage of the sixth resistance (R6') is higher than that of the third resistance (R3'), so the voltage of the sixth resistance (R6') arrives the overvoltage protection triggering point of the secondary IC early, and the overvoltage protection circuit of the secondary IC is triggered firstly.

In the same way, the overvoltage protection triggering range set in the main IC is 2.4V-2.6V, the highest output voltage of the LED drive output end is controlled at 90V. The main divider resistances R1, R2 and R3 of the main IC overvoltage triggering circuit satisfy: R3/(R1+R2)=2.4/(90−2.4), the resistances' values may be selected arbitrarily, as long as they satisfy the ratio relationship. For the secondary IC, the output overvoltage protection is activated before the output voltage value arrives at 90V, and the secondary IC overvoltage triggering circuit may be selected at 85V to calculate the ratio of the R4, R5 and R6. The triggering voltage may be selected at 2.6V for the secondary IC to make sure that the secondary IC trigger the protection mode firstly, as R6/(R4+R5)=2.6/(85−2.6), the resistance values may be selected arbitrarily, as long as they satisfy the ratio relationship. The voltage values of the main divider resistances and the secondary divider resistances are appointed by the ratio of the resistances' values.

The resistances' values are appointed according to the output voltage values, the ratio R3/(R1+R2+R3) is Va/(1.2*Vout), R1, R2 and R3 can be chosen arbitrarily on the kΩ level; according to Vb, the secondary IC's output voltage is less than the maximum of the output overvoltage 1.2*Vout to ensure that the maximum of the output overvoltage be less than that of the main IC when the secondary triggers, the ratio R6/(R4+R5+R6) is greater than Vb/(1.2*Vout), R4, R5 and R6 can be chosen arbitrarily on the kΩ level; overall, the ratio R6/(R4+R5+R6) is larger than R3/(R1+R2+R3), so that at any time of outputting the voltage, the voltage value of R6 must greater than that of R3, that means the secondary IC triggers the output overvoltage protection earlier than the main IC.

Wherein, the first resistance and the second resistance (R1+R2) can be replaced by one resistance, in the same manner, the third resistance R3 can also be replaced by multiple resistances, as long as they satisfy the aforementioned calculating ratio. The number and the arrangement method of the divider resistances may be chosen according to the need.

After calculating, the voltage value of the sixth resistance R6 of the second divider resistance is greater than that of the third resistance R3, the voltage value of the sixth resistance R6 arrives at the overvoltage protection point of the secondary IC 302, therefore, the secondary IC 302 triggers its overvoltage protection in advance. The whole circuit backs to the normal working statue by the control module 302a closing the voltage/current detecting of the LED strings having open circuits of the secondary detecting module 302b. When the voltage of the LED's drive output end 100 continues rising to the overvoltage protection triggering point of the main IC 202, the main IC 202 also trigger its overvoltage protection. The main control module 202a closes the voltage/current detection of the LED strings appearing the open circuit by the main detecting module 202b, at the same time, the main control module 202a controls the duty cycle D of the MOS tube to reduce, which results that the output voltage of the LEDs' drive output end 100 reduce to a normal working voltage. Wherein, there have a plurality of main divider and secondary resistances, and fine-tuning the resistance values of R1 and R2, or R4 and R5 can change the voltages of each resistance.

In the present invention, the range of the overvoltage protection triggering point of the main and secondary ICs is 2.4V-2.6V, and the overvoltage protection triggering point of the secondary IC is lower than that of the main IC, the overvoltage protection triggering point of the main IC is 2.6V, the overvoltage protection triggering point of the secondary IC is 2.4V. The values of each divider resistance can be set by the range of the overvoltage protection triggering point, therefore to ensure the secondary IC triggers earlier than the main IC when the output voltage increases, thus to ensure the whole circuit stable.

The present invention provides an overvoltage protection method adopting aforementioned overvoltage protection circuit; the method comprises the steps of:

Step 1: setting overvoltage protection points of the main IC and the secondary IC respectively in their overvoltage triggering circuits, the voltage value of the secondary IC's overvoltage protection triggering point is less that that of the main IC;

Step 2: with the output voltage rises, when the secondary detecting module detects the relationship of the voltage of the second divider resistances and the overvoltage protection triggering point of the secondary IC:

If the voltage of the second divider resistances arrives at that of the overvoltage protection triggering point, the secondary control module sends a closing detection instruction to the LED strings appearing open circuits to interrupt the voltage/current detection;

Step 3: when the main detecting module detects the relationship of the voltage of the main divider resistances and the overvoltage protection triggering point of the main IC:

If the voltage of the main divider resistances arrives at that of the overvoltage protection triggering point, the main control module sends a closing instruction to the LED strings appearing open circuits and to reduce the output voltage;

Step 4: the main control module adjusts the voltage adjusting extend of the LEDs' drive output end according to the feedback of the main detecting module;

Step 41: according to the feedback of the main detecting module, when to need increase the output voltage, the main control module sends a voltage rising control signal to a MOS tube to drive the MOS tube to increase its duty cycle, thus to drive the voltage increasing extend the LEDs' drive output end.

Step 42: when to need reduce the output voltage, the main control module sends a voltage reducing control signal to a MOS tube to drive the MOS tube to reduce its duty cycle, thus to drive the voltage reducing extend the LEDs' drive output end.

Please refer to FIGS. 2-4, the LED strings' control and the output voltage's adjustment further explain as the following. The overvoltage protection points are set respectively in the main IC 202 and the secondary IC 302. In the secondary IC 302, along with the output voltage rising, once the secondary detecting module 302b detects the voltage of the secondary divider resistance 30 arrives the overvoltage protection triggering point of the secondary IC 302, the secondary control module 302a sends a closing instruction to the LED strings appearing the open circuits to close the current/voltage detection of the corresponding LED strings 402; in the main IC 202, once the main detecting module 202b detects the voltage of the main divider resistance 20 arrives the overvoltage protection triggering point of the main IC 202, the main control module 202a sends a closing instruction to the LED strings appearing the open circuits to close the corresponding LED strings 401 and to drive the output voltage to reduce. In the present invention, when to need increase the output voltage, according to the feedback of the main detecting module 202b, the main control module 202a sends a voltage rising control signal to a MOS tube to drive the MOS tube to increase its duty cycle, thus to drive the voltage rising extend of the LEDs' drive output end; when to need reduce the output voltage, the main control module 202a sends a voltage reducing control signal to a MOS tube to drive the MOS tube to reduce its duty cycle, thus to drive the voltage reducing extend of the LEDs' drive output end.

The main detecting module 202b is coupled respectively to each LED string 401, and each LED string 401 is connected in series to a current limiting resistance 403. The current limiting resistance 403 can limit the current of each LED string, thus to avoid excessive current burning the LED strings. Once the main detecting module 202b detects that the values of voltage/current of the current limiting resistance 403 in certain LED string is larger than a predefined value, such feedback can be sent to the main control module 202a, which then sends an instruction of closing detection to the LED string 401, therefore to control the main detecting module 202b to close the corresponding current/voltage detection of the LED string 401, and to drive the voltage of the LED drive output end 100 to reduce. The secondary detecting module 302b is coupled respectively to each LED string 402, and each LED string 402 is connected in series to a current limiting resistance 403. Once the secondary detecting module 302b detects that the values of voltage/current of the current limiting resistance 403 in certain LED string is larger than a predefined value, such feedback can be sent to the secondary control module 302a, which then sends an instruction of closing detection to the LED string 402, therefore to control the secondary detecting module 302b to close the corresponding current/voltage detection of the LED string 402. The LED string of which the values of voltage/current is larger than a predefined value detected by the main detecting module 202b and the secondary detecting module 302b can be marked, and such marked signals can be send to the main control module 202a and the secondary control module 302a to make notified which LED string appears an open circuit, and then they send corresponding instructions to the MOS tube to make the negative control such as increasing/reducing its voltage or its on-off. In the present embodiment, the main IC overvoltage triggering circuit 201 is connected in parallel to two LED strings, and also the secondary IC overvoltage triggering circuit 301 is connected in parallel to two LED strings. Which can be understood is that the number of the LED strings is not limited, and it can be decided according to the need of a LCD TV.

The present invention provides a panel driving circuit having said overvoltage protection circuit, the overvoltage protection includes LED strings arranged with said main IC and said secondary ICs, and said overvoltage protection circuit arranged to adjust the voltage of the LED strings' drive output end.

For the overvoltage protection circuit of the present invention, the overvoltage triggering circuits are set respectively in the main IC and the secondary IC and controlled separately. The overvoltage protection point of the secondary IC is lower than that of the main IC by appointing the value of the divider resistances. When the voltage of the LED drive output end of the main IC arrives to the highest, once the voltage rises to the overvoltage protection point of the secondary IC, it triggers its own overvoltage protection, and via the negative feedback control of the secondary detecting module and the secondary control module, closes the detection control to the LED string appearing open circuit and connected in parallel thereto, and stops the current/voltage detection, therefore to make the whole circuit back to the normal working statue and avoid the interference of the LCD caused by voltage's instability of local LED string circuit. If the voltage of the LED drive output end rises to the overvoltage protection triggering point set by the main IC, then the main IC triggers it own overvoltage protection, and via the negative feedback control of the main detecting module and the main control module, closes the detection control to the LED string appearing open circuit and connected in parallel thereto, meanwhile, sends a voltage reducing instruction to the MOS tube to drive the voltage of the LED drive output end to be reduced, therefore to reduce the output voltage of the LED strings to ensure the whole circuit stable. In this way, the overvoltage protection of the main and secondary ICs can be triggered in a same abnormal situation, and the main and secondary ICs detect the working statue of the LED strings coupled with them in real-time, and cut off the inner detecting line corresponding to the LED string appearing open circuit, then the others LED strings construct a new line to continue working normally. The output voltage is reduced and recovered to be normal, thus to avoid a high-voltage statue to make the whole circuit unstable. The overvoltage protection circuit of the present invention changes the choosing proportion of the divider resistances of the main and secondary ICs, therefore, once an abnormal situation presents, the secondary IC triggers its overvoltage protection earlier than the main IC in the output voltage rising process controlled by the main IC.

What is claimed is:

1. An overvoltage protection circuit, arranged to adjust drive output voltage of LED strings coupled with a main IC and a secondary IC, comprises a main IC overvoltage triggering circuit and a secondary IC overvoltage triggering circuit, wherein, said main IC overvoltage triggering circuit connected respectively in series to said main IC and several LED strings, said secondary IC overvoltage triggering circuit connected respectively in series to the secondary IC and several LED strings, said main IC overvoltage triggering circuit comprises at least two main divider resistances connected in series each other, said secondary IC overvoltage triggering circuit comprises at least two secondary divider resistances connected in series each other, wherein, an overvoltage protection triggering point of the main IC is set in the main divider resistances, and an overvoltage protection triggering point of the secondary IC is set in the secondary divider resistances, and the voltage value of the overvoltage protection triggering point of the secondary IC is less than that of the main IC, wherein the mininmin voltage of said secondary IC overvoltage triggering circuit is larger than the maximum voltage of said main IC, wherein said main divider resistance comprises a first resistance, a second resistance and a third resistance, said first resistance and said second resistance are set between the overvoltage protection triggering point of the main IC and the drive output end, said third resistance is set between the overvoltage protection triggering points of the main IC and the ground end, a forth and a fifth resistances are set between the overvoltage protection triggering points of the secondary IC, and the drive output end a sixth resistance is set between the overvoltage protection triggering points of the secondary IC and the ground end, wherein, the ratio of the sixth resistance value and the sum of the forth, the fifth and the sixth resistance values of the second divider resistance is larger than the ratio of the third resistance value and the sum of the first, the second and the third resistance values of the main divider resistance.

2. The overvoltage protection circuit according to claim 1, wherein the minimum voltage of said secondary IC is 0.7-IV larger that the maximum voltage of said main IC.

3. The overvoltage protection circuit according to claim 1, wherein said third resistance value of the main divider resistances is equal to that of said sixth resistance.

4. The overvoltage protection circuit according to claim 1, wherein said main IC comprises a main control module and a main detecting module coupled thereof, said main detecting module is coupled to the main divider resistances to detect the voltage's change of the main divider resistances, said main control module is coupled to the driving output end of the LED strings to adjust the voltage of the driving output end according the detecting result of the main detecting module; in the main IC, the main control module sends a closing detection instruction to the LED strings appearing open circuits to interrupt the voltage/current detection and to drive the driving output end of the LED strings to reduce its output voltage when the main detecting module detects that the voltage of the main divider resistances arrives at that of the overvoltage protection point of the main IC.

5. The overvoltage protection circuit according to claim 4, wherein said secondary IC comprises a secondary control module and a secondary detecting module coupled thereof, said secondary detecting module is coupled to the second divider resistances to detect the voltage's change of the second divider resistances, said secondary control module is coupled to the driving output end to adjust the voltage of the driving output end according the detecting result of the secondary detecting module, in the secondary IC, with the output voltage rises, the secondary control module sends a closing detection instruction to the LED strings appearing open circuits to interrupt the voltage/current detection when the secondary detecting module detects that the voltage of the second divider resistances arrives at that of the overvoltage protection point of the secondary IC.

6. The overvoltage protection circuit according to claim 1, wherein said main detecting module is coupled respectively to each LED string that is connected in series to a current limiting resistance, once the main detecting module detects that the voltage value of a current limiting resistance of certain LED string' circuit is larger that a predefined value, it feedbacks to the main control module, which then to send a closing detection instruction to the LED string to close the detection of the corresponding LED string and to control the driving output end of the LED string to reduce its output voltage.

7. The overvoltage protection circuit according to claim 6, wherein said secondary detecting module is coupled respectively to each LED string that is connected in series to a current limiting resistance, once the secondary detecting module detects that the voltage value of a current limiting resistance of certain LED string's circuit is larger that a predefined value, it feedbacks to the secondary control module, which then to send a closing detection instruction to the LED string to close the detection of the corresponding LED string, said main IC and said secondary IC control each LED string' opening and closing by a negative feedback.

8. A panel driving circuit. wherein, it comprises LED strings arranged with said main IC and said secondary IC, and an overvoltage protection circuit arranged to adjust the voltage of the LED strings' drive output end coupled with a main IC and a secondary IC, wherein the overvoltage protection circuit comprises a main IC overvoltage triggering circuit and a secondary IC overvoltage triggering circuit, wherein, said main IC overvoltage triggering circuit connected respectively in series to said main IC and several LED strings, said secondary IC overvoltage triggering circuit connected respectively in series to the secondary IC and several LED strings, said main IC overvoltage triggering circuit comprises at least two main divider resistances connected in series each other, said secondary IC overvoltage triggering circuit comprises at least two secondary divider resistances connected in series each other, wherein, an overvoltage protection triggering point of the main IC is set in the main divider resistances, and an overvoltage protection triggering point of the secondary IC is set in the secondary divider resistances, and the voltage value of the overvoltage protection triggering point of the secondary IC is less than that of the main IC, wherein the minimum voltage of said secondary IC overvoltage triggering circuit is larger than the maximum voltage of said main IC, wherein said main divider resistance comprises a first resistance, a second resistance and a third resistance, said first resistance and said second resistance are set between the overvoltage protection triggering point of the main IC and the drive output end, said third resistance is set between the overvoltage protection triggering points of the main IC and the ground end, a forth and a fifth resistances are set between the overvoltage protection triggering points of the secondary IC, and the drive output end a sixth resistance is set between the overvoltage protection triggering points of the secondary IC and the ground end, wherein, the ratio of the sixth resistance value and the sum of the forth, the fifth and the sixth resistance values of the second divider resistance is larger than the ratio of the third resistance value and the sum of the first, the second and the third resistance values of the main divider resistance.

* * * * *